US012714064B2

(12) United States Patent
Dudley

(10) Patent No.: US 12,714,064 B2
(45) Date of Patent: Aug. 25, 2026

(54) SMALL PET BURROWING DEVICE

(71) Applicant: PERITAS BRANDS, LLC, Niceville, FL (US)

(72) Inventor: Charles Weston Dudley, Destin, FL (US)

(73) Assignee: PERITAS BRANDS, LLC, Niceville, FL (US)

( * ) Notice: Subject to any disclaimer, the term of this patent is extended or adjusted under 35 U.S.C. 154(b) by 35 days.

(21) Appl. No.: 18/194,647

(22) Filed: Apr. 2, 2023

(65) Prior Publication Data

US 2024/0324550 A1 Oct. 3, 2024

(51) Int. Cl.
*A01K 1/035* (2006.01)

(52) U.S. Cl.
CPC .................................... *A01K 1/035* (2013.01)

(58) Field of Classification Search
CPC .................... A01K 29/00; A01K 1/029; A01K 1/035–0356; A01K 1/0254; A01K 29/007
See application file for complete search history.

(56) References Cited

U.S. PATENT DOCUMENTS

| | | | | |
|---|---|---|---|---|
| 2,032,248 | A * | 2/1936 | Bins | A01K 1/0353 119/482 |
| 2,775,222 | A | 12/1956 | Kruck | |
| 4,008,687 | A | 2/1977 | Keys | |
| 4,893,586 | A * | 1/1990 | Carson | A01K 1/035 119/1 |
| 5,010,843 | A * | 4/1991 | Henry | A01K 1/0353 119/28.5 |
| 5,327,851 | A | 7/1994 | Pare | |
| 5,765,502 | A | 6/1998 | Haugh | |
| D501,063 | S * | 1/2005 | Bertoli | D30/108 |
| 7,530,326 | B2 | 5/2009 | Dunn | |
| 7,676,871 | B1 * | 3/2010 | Leach | 5/655 |
| D632,025 | S | 2/2011 | Cole | |
| 8,387,186 | B2 * | 3/2013 | Yu | A47C 3/16 297/219.1 |
| 8,397,672 | B2 | 3/2013 | Zine | |
| 8,479,334 | B1 * | 7/2013 | Leach | A61G 9/00 5/655 |
| 9,788,663 | B2 * | 10/2017 | Furuland | A47D 15/008 |
| 10,966,405 | B2 | 4/2021 | Lee | |
| D930,268 | S | 9/2021 | Lee | |
| 11,129,357 | B1 | 9/2021 | Lee | |
| 11,445,697 | B2 * | 9/2022 | Taylor | A01K 1/0353 |

(Continued)

FOREIGN PATENT DOCUMENTS

| | | | | |
|---|---|---|---|---|
| AU | 2020100712 | A4 * | 6/2020 | A47D 9/00 |
| KR | 20200040161 | A * | 4/2020 | A01K 1/029 |
| RU | 177496 | U1 * | 2/2018 | A01K 1/035 |

*Primary Examiner* — Carly W. Lynch
(74) *Attorney, Agent, or Firm* — Renner, Otto, Boisselle & Sklar, LLP

(57) ABSTRACT

A burrowing nest is configured to allow animals to burrow into the burrowing nest. The burrowing nest includes a nest ring that is comprised of a plush inner material which is covered by a soft outer covering. A flexible sleeve is affixed to a side of the nest ring such that an animal can climb through the nest ring and into the flexible sleeve. The flexible sleeve includes a removably attached bottom that may be comprised of a flexible, absorbent, padded or permeable material.

18 Claims, 7 Drawing Sheets

(56) References Cited

U.S. PATENT DOCUMENTS

| | | | | |
|---|---|---|---|---|
| 2002/0074372 | A1* | 6/2002 | Pickett | A01K 1/0254 224/576 |
| 2006/0266294 | A1 | 11/2006 | Holmes | |
| 2007/0022526 | A1* | 2/2007 | Leach | A47K 3/127 4/572.1 |
| 2007/0044722 | A1* | 3/2007 | West | A01K 1/0353 119/28.5 |
| 2007/0204402 | A1* | 9/2007 | Harris | A47D 13/08 5/655 |
| 2008/0066686 | A1 | 3/2008 | Lockwood | |
| 2010/0224137 | A1* | 9/2010 | Pugh | A01K 1/032 119/513 |
| 2013/0180463 | A1* | 7/2013 | Messner | A01K 1/035 119/498 |
| 2013/0284099 | A1* | 10/2013 | Oakes, Jr. | A01K 29/00 119/28.5 |
| 2014/0190417 | A1* | 7/2014 | Lipscomb | A01K 1/035 119/28.5 |
| 2016/0198675 | A1* | 7/2016 | Liu | A01K 1/035 |
| 2017/0049246 | A1* | 2/2017 | Lau | A47D 13/025 |
| 2018/0338628 | A1* | 11/2018 | Goodwin | A47D 15/008 |
| 2019/0021275 | A1* | 1/2019 | Chaudhry | A01K 1/029 |
| 2021/0137069 | A1* | 5/2021 | Miller | A01K 1/0353 |
| 2022/0192147 | A1* | 6/2022 | Chitnis | A01K 1/029 |
| 2022/0217938 | A1 | 7/2022 | Lee | |
| 2023/0093090 | A1* | 3/2023 | Woolf | A01K 1/035 119/28.5 |
| 2023/0097813 | A1* | 3/2023 | May | A01K 1/0353 119/28.5 |
| 2023/0200349 | A1* | 6/2023 | Tuthill | A01K 1/0353 119/28.5 |
| 2023/0255176 | A1* | 8/2023 | Neuenschwander | A01K 15/025 119/416 |

* cited by examiner 58
56
54
52

SMALL PET BURROWING DEVICE

FIELD OF INVENTION

The present invention relates to a burrowing nest for pets.

BACKGROUND

Many domesticated animals are natural burrowing animals, such as dogs, rabbits, and guinea pigs. These animals instinctively burrow because burrowing gives them a sense of security. Not only do burrowing make these animals feel safe, but it also helps them remain calm. Burrowing can help animals regulate their body temperature by keeping them out of the sun or insulating them from the cold.

SUMMARY OF THE INVENTION

Conventional pet bedding does not allow pets to burrow. Most pet bedding is comprised of a mattress base and a soft covering. Typically, these bases are solid and do not permit an animal to burrow down into the bedding. Furthermore, conventional pet beddings are cumbersome to clean in case of accidents. Lastly, conventional pet beds do not have modular bases that allow pet owners to adjust the base to conform to the needs of their pet. The present invention addresses these deficiencies in conventional pet bedding.

The present disclosure relates to a burrowing nest that is configured to allow animals to burrow into the burrowing nest. The burrowing nest includes a nest ring that is comprised of a plush inner material which is covered by a soft outer covering. A flexible sleeve is affixed to a side of the nest ring such that an animal can climb through the nest ring and into the flexible sleeve. The flexible sleeve includes a removably attached bottom or an insertable bottom that may be comprised of a flexible, absorbent, padded or permeable material.

Final Version of Claims Repeated Here

The accompanying drawings, which are incorporated in and constitute a part of the specification, illustrate various example systems, methods, and so on, that illustrate various example embodiments of aspects of the invention. It will be appreciated that the illustrated element boundaries (e.g., boxes, groups of boxes, or other shapes) in the figures represent one example of the boundaries. One of ordinary skill in the art will appreciate that one element may be designed as multiple elements or that multiple elements may be designed as one element. An element shown as an internal component of another element may be implemented as an external component and vice versa. Furthermore, elements may not be drawn to scale.

DETAILED DESCRIPTION

Figure 1:
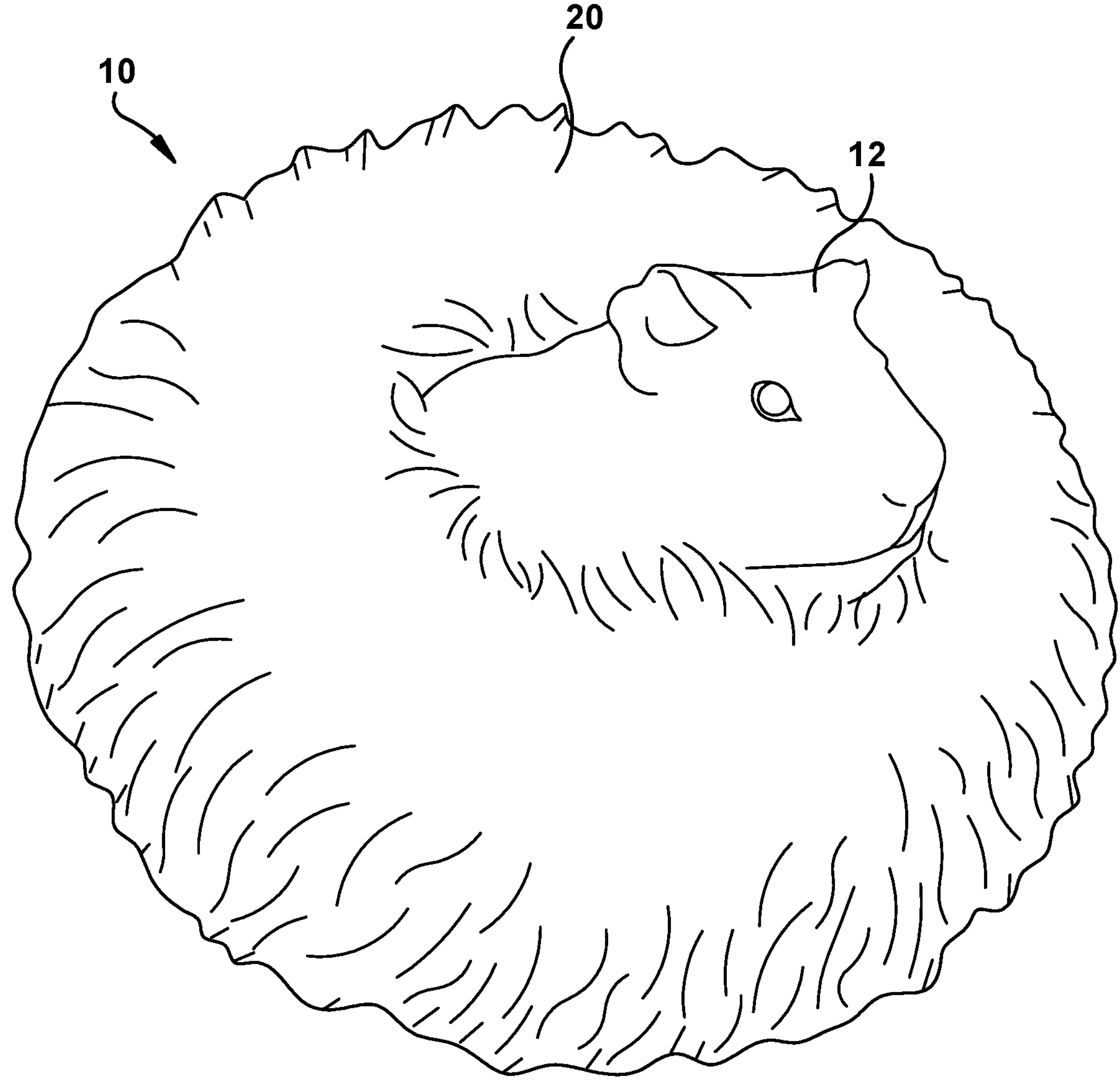
FIG. 1 illustrates a perspective view of an exemplary burrowing nest.
Figure 2:
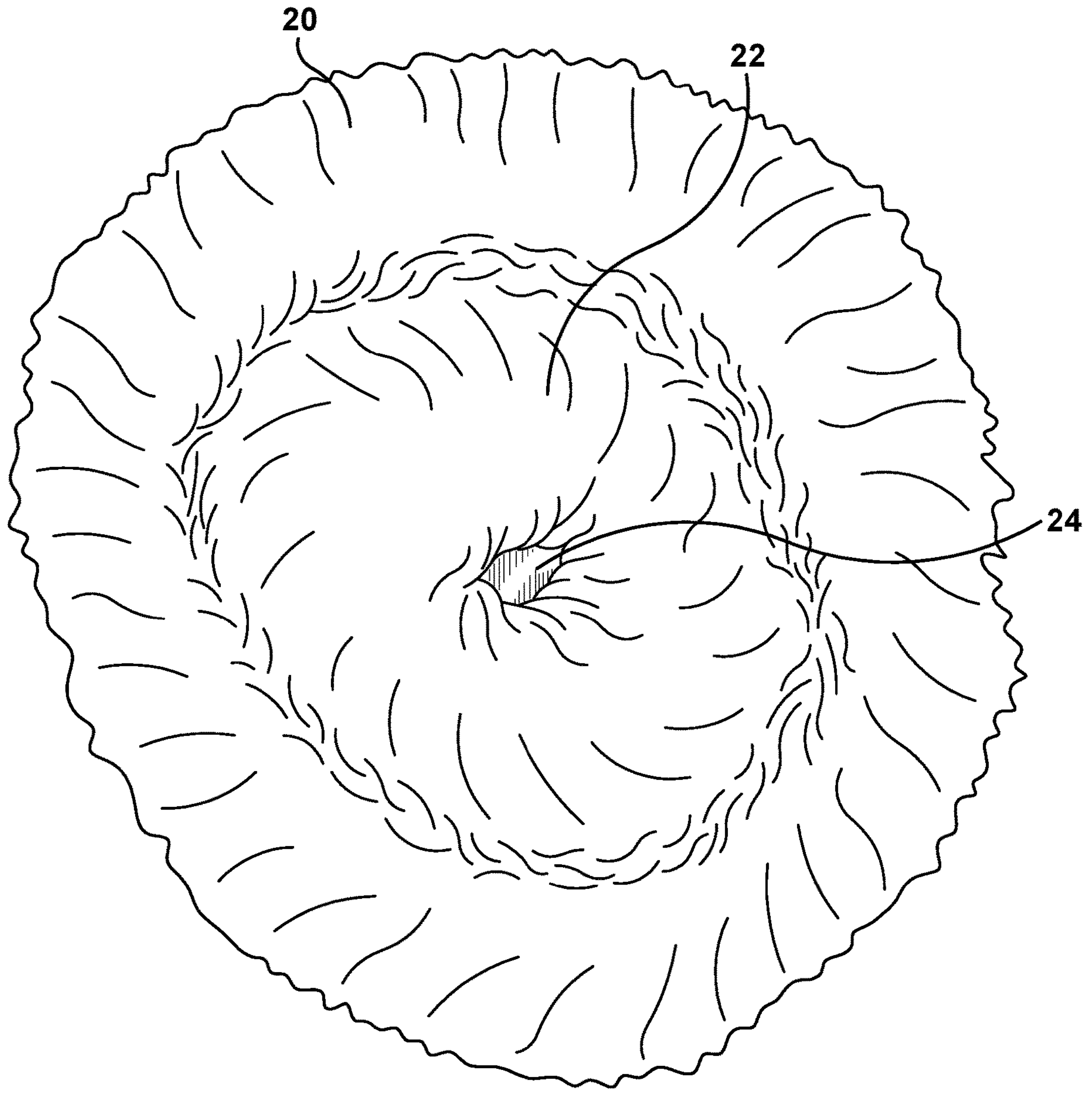
FIG. 2 illustrates a top view of the burrowing nest of FIG. 1

FIGS. 1-6 illustrate an exemplary burrowing nest 10 which is configured to allow a pet 12 to burrow into the burrowing nest 10.

The burrowing nest 10 includes a nest ring 20 and a nest body 22. The nest ring 20 and the nest body 22 are both annularly shaped. In other embodiments, the nest ring 20 and nest body 22 are not annularly shaped but may be other shapes such as squares, rectangles, and triangles. The nest ring 20 is configured such that the nest body 22 is disposed within or connected to the nest ring 22. The nest ring 20 may be thicker than the nest body 22 whereby the nest ring acts as a boundary to help retain the pet 12 in the burrowing nest 10. The nest body 22 has a hole 24 extending through the nest body 22 such that the pet 12 can pass through the nest body 22. The nest body 22 may be lined by a flexible sleeve 26. The flexible sleeve 26 may be affixed to the nest ring or nest body 22 at a first end 28 of the flexible sleeve 26 by means of affixing such as sewing, adhesives, bonding, or a combination thereof. The flexible sleeve 26 is configured such that it has a circumference which may encompass the hole 24 in the nest body 22. The hole 24 is configured such that the hole diameter is less than the diameter of the nest ring 20 and less than the diameter of the flexible sleeve 26. A bottom 32 is removably attachable to a second end 30 of the flexible sleeve 26.

The nest ring 20 is configured such that the nest ring 20 is soft and plush to the touch and has a soft lining (e.g., fur, hair-like fibers, fleece, polyester, or a combination thereof extending from the ring's core) for a pet to interact with. When using fur, individual fibers in the fur may extend, for example, one to five centimeters from the ring's core. In one embodiment, the nest ring 20 is not rigid, which allows the nest ring to be compressed, bent, or otherwise deformed. The nest ring 20 may be comprised of a plush inner material that is comfortable to lay on and a fluffy outer covering that also retains the plush inner material in a ring shape. The plush inner material may be comprised of foam, polyester fill, polypropylene fill, cotton, or a combination thereof. The fluffy outer covering may be made of faux fur, polyester, microfiber, suede, nylon, viscose fabric, polypropylene, polyurethane, polyvinyl chloride (PVC fabric), natural fibers such as cotton, synthetic fibers, or a combination thereof.

The fluffy nest ring 20 is advantageous over conventional beds with rigid rings because it allows the pet to rest on the nest ring as part of bedding, whereas rigid rings are hard and uncomfortable and serve only to create an opening.

The flexible sleeve 26 may be made of a stretchable fabric such as spandex, elastane, or lycra, or a combination thereof, such that when a pet 12 burrows into the burrowing nest 10 the flexible sleeve may expand as the pet pushes against it and the nest body 22. The bottom 32 may also be made of a stretchable fabric such as spandex, elastane, neoprene, lycra, or a combination thereof. In a further embodiment, the bottom 32 may be made of a blend of a non-stretchable fabric, such as polyester, and a stretchable fabric, such as spandex. It is anticipated that the bottom 32 may further be a blend of more than one non-stretchable fabric and more than one stretchable fabric. In one embodiment, the flexible areas are 88% polyester and 12% spandex blend. In other embodiments, the flexible areas are other percentages polyester/spandex blends or other materials. When the bottom 32 is flexible, a pet 12 may burrow into the burrowing nest 10 and the flexible bottom 32 can flex in response to the pressure the pet is applying to it. This expansion allows for burrowing animals to rest deeper within the burrowing nest 10 and get the sensation of calm that the pet 12 seeks when burrowing.

The nest body 22 and/or the flexible sleeve 26 may have a fluffy/furry lining (i.e., hair-like fibers extending into the sleeve's inside) disposed on an inner surface of nest body 22 and/or flexible sleeve 26. Individual fibers in the furry lining may extend, for example, one to five centimeters from the inner surface of the nest body 22 and/or the sleeve 26. The fluffy/furry lining allows the nest 10 to better simulate a burrow by creating a tighter inner diameter and allowing the pet 12 to have something to cling to and move while burrowing into the nest 10. The tight inner diameter of the fluffy/furry lining also helps calm the pet 12 because by having a tighter sleeping area the nest 10 allows the pet 12 to have the safe and secure feeling that burrowing animals feel when burrowing into the ground. The fluffy/furry lining may be comprised of a plush fill material that is comfortable to lay on and a fluffy covering which retains the plush material. The plush fill material may be comprised of foam or polyester fill or a combination thereof. The fluffy covering may be comprised faux fur, polyester, microfiber, or suede, or a combination thereof.

Figure 3:
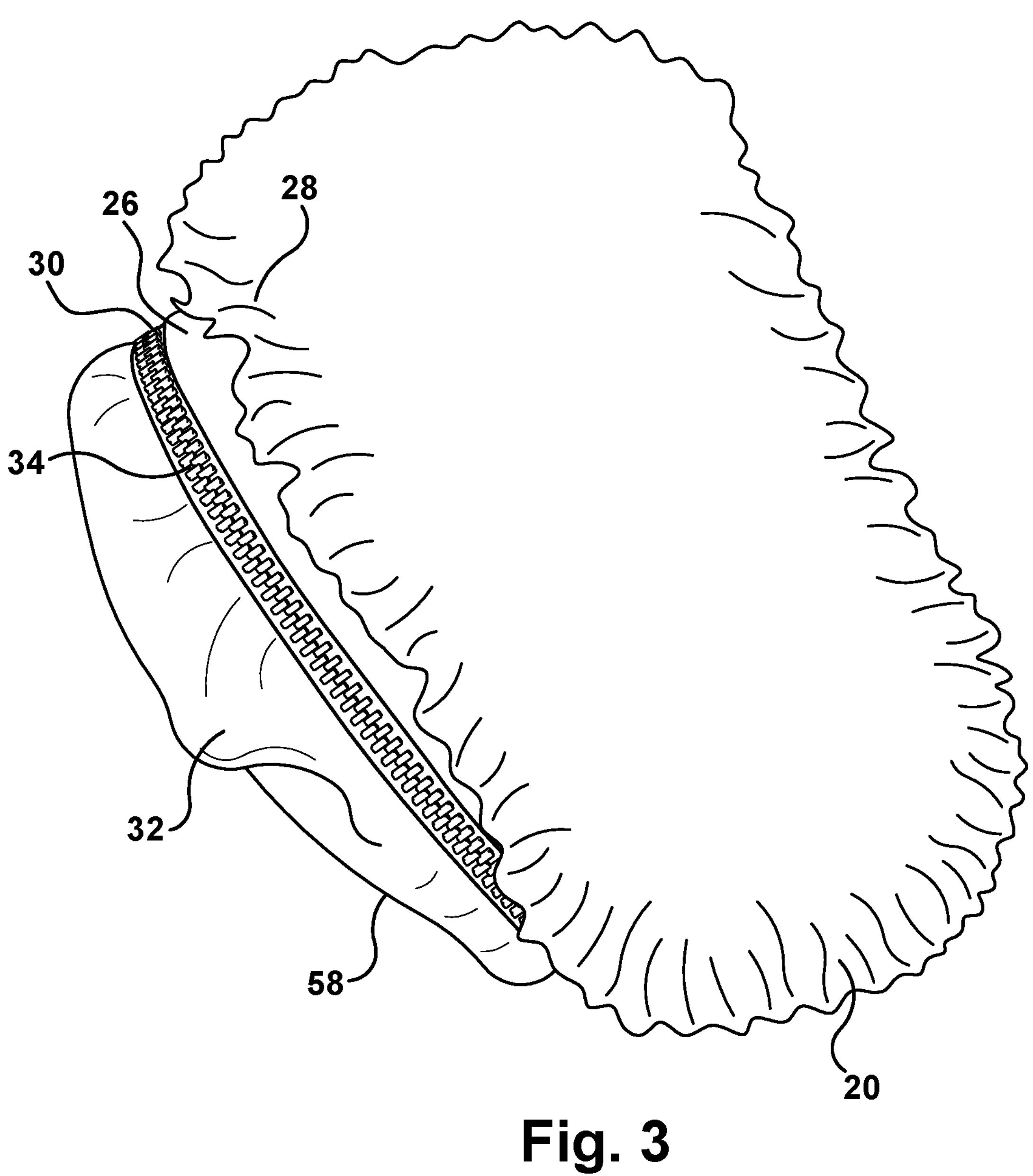
FIG. 3 illustrates a side view of the burrowing nest of FIG. 1 in an unexpanded state.
Figure 4:
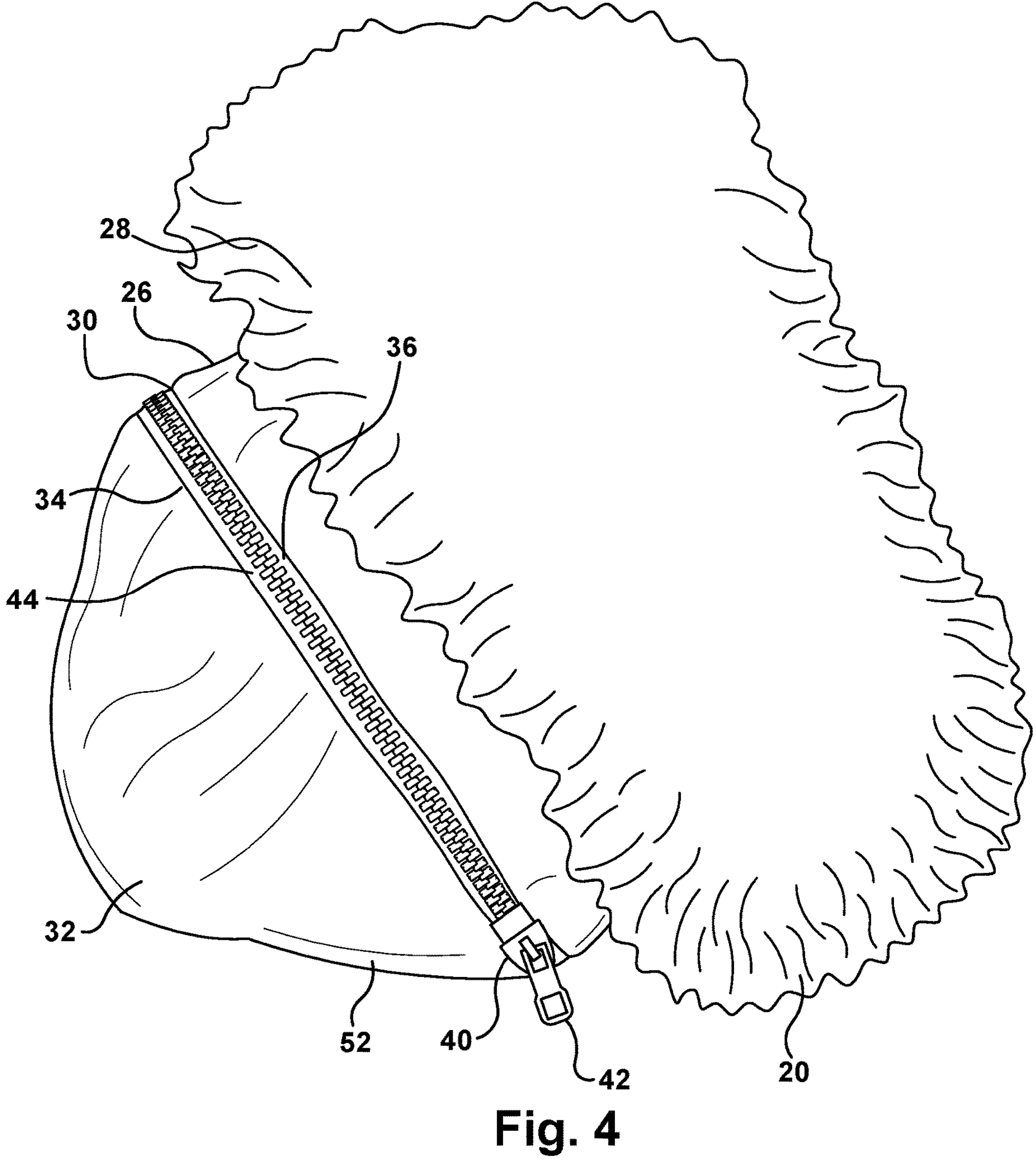
FIG. 4 illustrates a side view of the burrowing nest of FIG. 1 in an expanded state.
Figure 5:
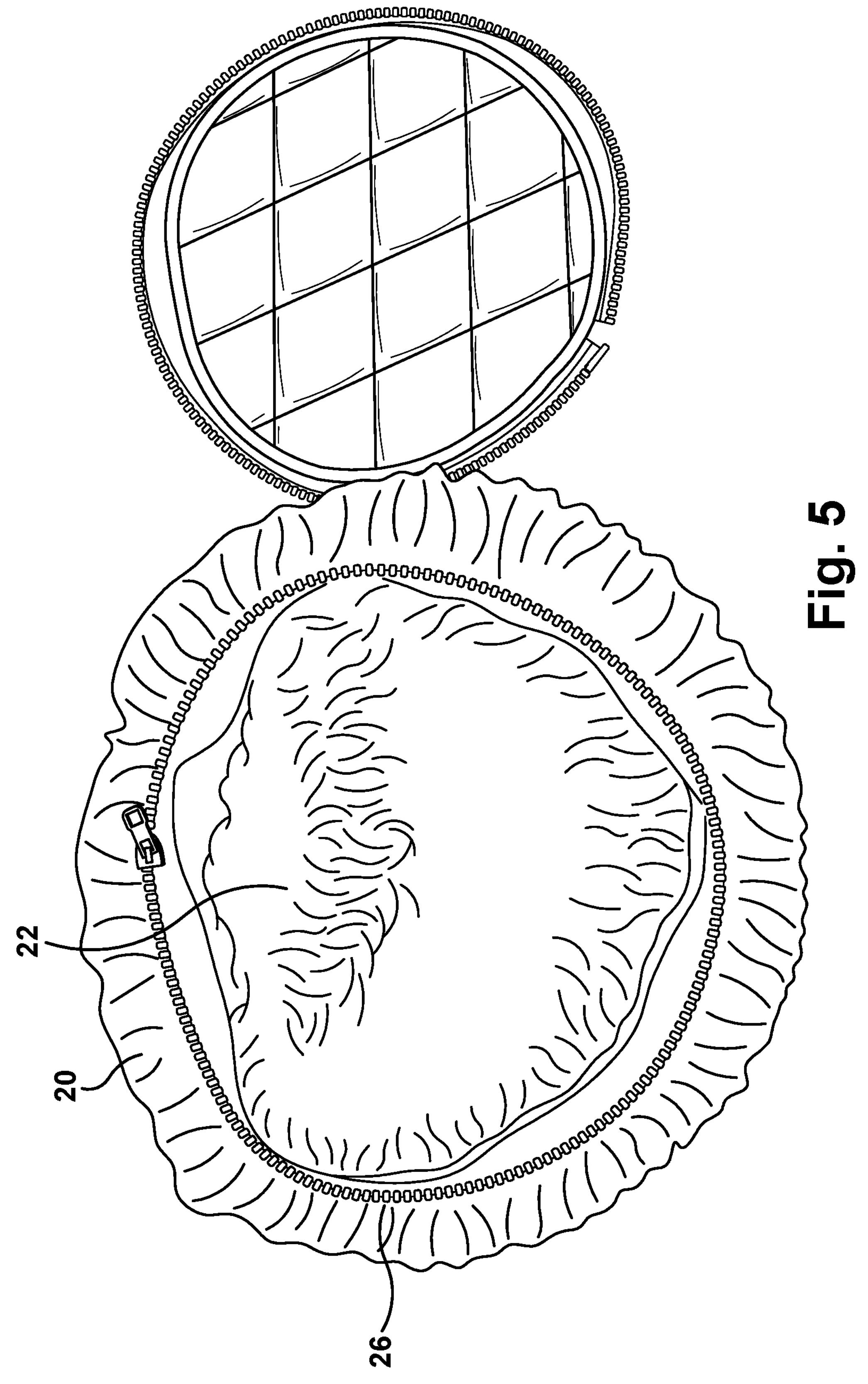
FIG. 5 illustrates a top view of the burrowing nest of FIG. 1 wherein a removably attached bottom is unaffixed to the burrowing nest.

As shown in FIGS. 3-5, the bottom 32 may be removably attached to the second end 30 of the flexible sleeve 26 by a zipper 34. The zipper 34 may be a conventional zipper such that the second end 30 of the flexible sleeve 26 has a first row of teeth 36, a slider head 40, and a pull tab 42. The bottom 32 may have a corresponding second row of teeth 44 that are configured to mate with the first row of teeth 36. The first row of teeth 36 and second row of teeth 44 may be affixed around the circumference of the flexible sleeve 26 and bottom 32, respectively. The bottom 32 may be removed by unzipping the zipper 34 and replacing the existing bottom with a desired, different bottom 32.

Figure 6:
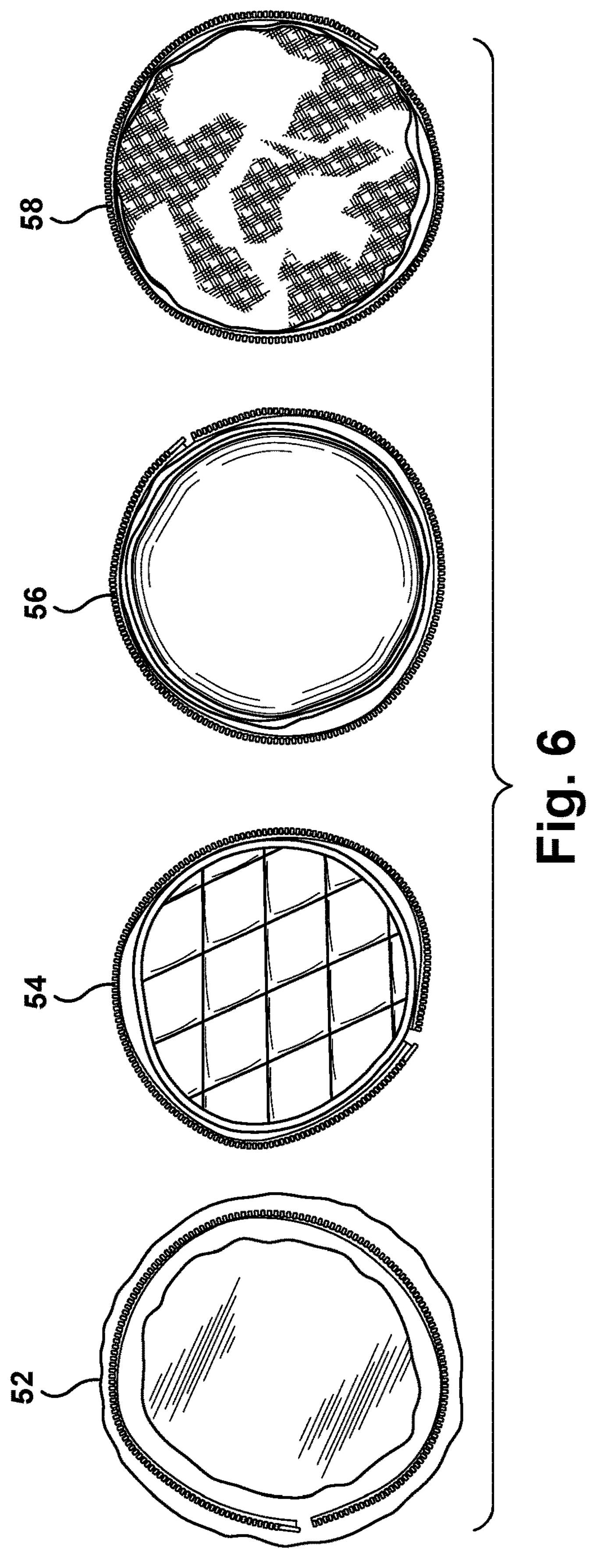
FIG. 6 illustrates a top view of a plurality of removably attachable bottoms.

As shown in FIG. 6, the bottom 32 may be a flexible bottom 52. The flexible bottom 52 may be comprised of spandex, polyester, polyester-spandex blends, elastane, lycra, neoprene, polyurethane, natural fibers including cotton, or a combination thereof. In another embodiment, the bottom 32 may be an absorbent bottom 54. The absorbent bottom may be comprised of polyester, viscose fabric, thermoplastic polyurethane fabric (TPU fabric), polypropylene, polyurethane, PVC fibers, natural fibers such as cotton, or a combination thereof. The absorbent bottom 54 may find particular application for pets that have frequent accidents. The absorbent bottom 54 may include a hydrophobic bottom layer to make sure any liquid is contained in the absorbent bottom 54. This is especially helpful so the liquid does not flow through to get on the pet owner when on their lap. In another embodiment, the bottom 32 may be a padded bottom 56. The padded bottom 54 may be comprised of polyester, polypropylene, polyurethane, natural fibers such as cotton, viscose fabric, TPU fabric, PVC fabric, or a combination thereof. The padded bottom 56 may find particular application for pets that need a softer surface to be comfortable. In another embodiment, the bottom 32 may be a permeable bottom 58. The permeable bottom 54 may be comprised of polyester, nylon, spandex, polyester-spandex blends, elastane, lycra, viscose fabric, polypropylene, polyurethane, natural fibers such as cotton, or a combination thereof. The permeable bottom 58 may find particular application for pets that get overheated easily.

In another embodiment, the bottom 32 may be attached by a plurality of fasteners, different from the zipper 34, disposed around the circumference of the flexible sleeve 26 and/or bottom 32. The fasteners may include snaps, hook and loop fasteners, buttons, or any other suitable means of fastening. In an even further embodiment, the burrowing nest 10 may utilize a combination of fasteners to removably secure the bottom 32.

Figure 7:
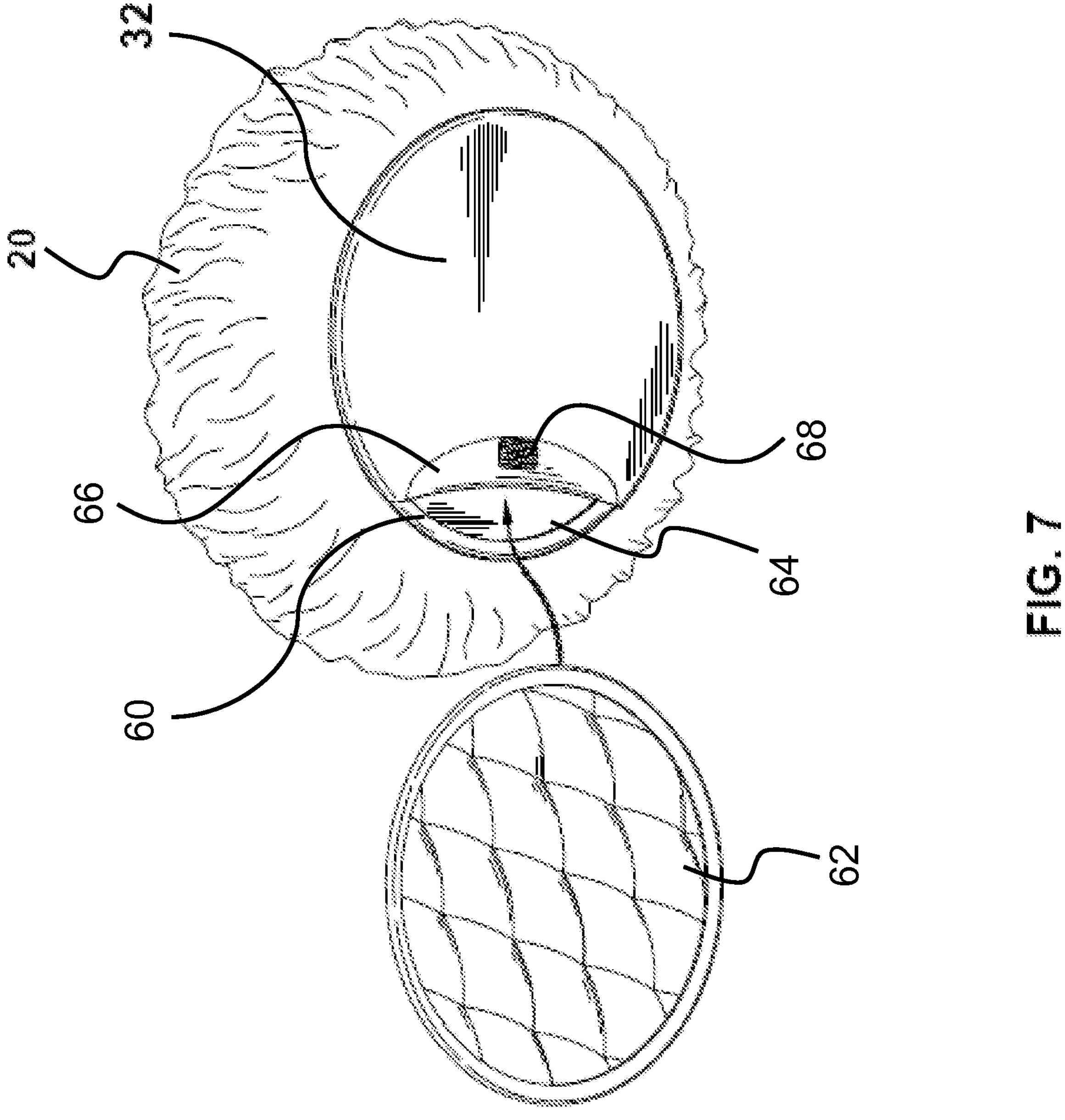
FIG. 7 illustrates a bottom view of an exemplary burrowing nest with a pocket and insert.

As shown in FIG. 7, in one embodiment, the whole bottom 32 is not removable. Instead, the bottom 32 has built therein a sleeve or pocket 60 for a user to slide in a removable bottom insert 62, which may be an absorbent liner, a padded bottom, etc. The pocket 60 may include a pocket opening 64 and a pocket flap 66. The pocket flap 66 may be configured to be releasably fastened to the pocket opening 64 by a fastener 68. When the pocket flap 66 is fastened to the pocket opening 64 the removable insert 62 is securely retained within the pocket 60. When the pocket flap 66 is not fastened to the pocket opening 64, the removable insert 62 can be inserted into or removed from the pocket 60. In the depicted embodiment, the faster 68 is shown as a hook and loop fastener, however it is to be appreciated that in further embodiments the fastener 68 may be a button and loop faster, a snap fastener, a clip, or a combination thereof. In a further embodiment, the pocket opening 64 and pocket flap 66 may have a plurality of fasteners 68 to further secure the removable insert 62 in the pocket 60. In a further embodiment, the pocket may be configured to receive a plurality of removable inserts 62.

The insert 62 may be comprised of spandex, polyester, polyester-spandex blends, elastane, lycra, neoprene, polyurethane, natural fibers including cotton, or a combination thereof. In another embodiment, the insert 62 may be an absorbent bottom comprised of polyester, viscose fabric, thermoplastic polyurethane fabric (TPU fabric), polypropylene, polyurethane, PVC fibers, natural fibers such as cotton, or a combination thereof. The absorbent insert may include a hydrophobic bottom layer to make sure any liquid is contained in the absorbent insert. In another embodiment, the insert 62 may be a padded bottom comprised of polyester, polypropylene, polyurethane, natural fibers such as cotton, viscose fabric, TPU fabric, PVC fabric, or a combination thereof. In another embodiment, the insert 62 may be a permeable bottom comprised of polyester, nylon, spandex, polyester-spandex blends, elastane, lycra, viscose fabric, polypropylene, polyurethane, natural fibers such as cotton, or a combination thereof.

In some embodiments, the nest ring 20, the nest body 22, and the flexible sleeve 26 may be a single structure. In a further embodiment the nest ring 20, the nest body 22, and the flexible sleeve 26 may be separate structures that are connected together.

Definitions

The following includes definitions of selected terms employed herein. The definitions include various examples or forms of components that fall within the scope of a term and that may be used for implementation. The examples are not intended to be limiting. Both singular and plural forms of terms may be within the definitions.

An "operable connection," or a connection by which entities are "operably connected," is one in which signals, physical communications, or logical communications may be sent or received. Typically, an operable connection includes a physical interface, an electrical interface, or a data interface, but it is to be noted that an operable connection may include differing combinations of these or other types of connections sufficient to allow operable control. For example, two entities can be operably connected by being able to communicate signals to each other directly or through one or more intermediate entities like a processor, operating system, a logic, software, or other entity. Logical or physical communication channels can be used to create an operable connection.

To the extent that the term "includes" or "including" is employed in the detailed description or the claims, it is intended to be inclusive in a manner similar to the term "comprising" as that term is interpreted when employed as a transitional word in a claim. Furthermore, to the extent that the term "or" is employed in the detailed description or claims (e.g., A or B) it is intended to mean "A or B or both." When the applicants intend to indicate "only A or B but not both" then the term "only A or B but not both" will be employed. Thus, use of the term "or" herein is the inclusive, and not the exclusive use. See, Bryan A. Garner, A Dictionary of Modern Legal Usage 624 (2d. Ed. 1995).

While example systems, methods, and so on, have been illustrated by describing examples, and while the examples have been described in considerable detail, it is not the intention of the applicants to restrict or in any way limit scope to such detail. It is, of course, not possible to describe every conceivable combination of components or methodologies for purposes of describing the systems, methods, and so on, described herein. Additional advantages and modifications will readily appear to those skilled in the art. Therefore, the invention is not limited to the specific details, the representative apparatus, and illustrative examples shown and described. Thus, this application is intended to embrace alterations, modifications, and variations that fall within the scope of the appended claims. Furthermore, the preceding description is not meant to limit the scope of the invention. Rather, the scope of the invention is to be determined by the appended claims and their equivalents.

What is claimed is:

1. A burrowing nest comprising:

a nest ring; and a nest body disposed within the nest ring, wherein the nest body has a hole extending therethrough; and a flexible sleeve affixed to the nest body, wherein the flexible sleeve has an outer perimeter that encompasses the hole in the nest body, wherein the hole allows passage into the flexible sleeve, wherein:

the nest ring includes a plush inner material and a fluffy outer covering that retains the plush inner material in a ring shape, the nest ring being non-rigid and providing a soft surface for an animal to rest on, the fluffy outer covering extending partially into the hole to form an inner lining of the hole in the nest ring, and the flexible sleeve is connected at one end to a removably attached bottom.

2. The burrowing nest according to claim 1, wherein the flexible sleeve is configured to expand when a pet burrows in the burrowing nest.

3. The burrowing nest according to claim 1, wherein the removably attached bottom is a flexible bottom which is configured to expand when a pet burrows in the burrowing nest.

4. The burrowing nest according to claim 3, wherein the flexible sleeve and the removably attached bottom are comprised of a stretchable material at least including spandex.

5. The burrowing nest according to claim 1, wherein the removably attached bottom is removably attached to the flexible sleeve by fasteners disposed around a circumference of the flexible sleeve.

6. The burrowing nest according to claim 1, wherein the removably attached bottom is removably attached to the flexible sleeve by a zipper.

7. The burrowing nest according to claim 1, wherein the removably attached bottom is absorbent.

8. The burrowing nest according to claim 1, wherein the removably attached bottom is padded.

9. The burrowing nest according to claim 1, wherein the removably attached bottom is permeable.

10. The burrowing nest according to claim 1, wherein the plush inner material is comprised of foam, polyester fill, polypropylene fill, cotton, or a combination thereof.

11. The burrowing nest according to claim 1, wherein the fluffy outer covering is comprised of one of, or a combination of more than one of faux fur, polyester, microfiber, suede, nylon, viscose fabric, polypropylene, polyurethane, polyvinyl chloride (PVC fabric), natural fibers including cotton, synthetic fibers, or a combination thereof.

12. A burrowing nest comprising:

a nest ring;

a nest body disposed within the nest ring, wherein the nest body has a hole extending therethrough;

a flexible sleeve affixed to the nest body, wherein the flexible sleeve has an outer perimeter that encompasses the hole in the nest body, wherein the hole allows passage into the flexible sleeve; and wherein:

the nest ring includes a plush inner material and a fluffy outer covering that retains the plush inner material in a ring shape, the nest ring being non-rigid and providing a soft surface for an animal to rest on, the fluffy outer covering extending partially into the hole to form an inner lining of the hole in the nest body, and the flexible sleeve is connected at one end to a removably attached absorbent bottom provided with a hydrophobic bottom layer.

13. The burrowing nest according to claim 12, wherein the flexible sleeve is configured to expand when a pet burrows in the burrowing nest.

14. The burrowing nest according to claim 13, wherein the removably attached bottom is a flexible bottom and configured to expand when a pet burrows in the burrowing nest.

15. The burrowing nest according to claim 14, wherein the flexible bottom is removably attached to the flexible sleeve by fasteners disposed around a circumference of the flexible sleeve.

16. The burrowing nest according to claim 14, wherein the flexible bottom is removably attached to the flexible sleeve by a zipper.

17. The burrowing nest according to claim 12, wherein the removably attached bottom is flexible or padded.

18. A burrowing nest comprising:

a nest ring;

a nest body disposed within the nest ring, wherein the nest body has a hole extending therethrough; and a flexible sleeve affixed to the nest body, wherein the flexible sleeve has an outer perimeter that encompasses the hole in the nest body, wherein the hole allows passage into the flexible sleeve, wherein:

the nest ring includes a plush inner material and a fluffy outer covering that retains the plush inner material in a ring shape, the nest ring being non-rigid and providing a soft surface for an animal to rest on, the fluffy outer covering extending partially into the hole to form an inner lining of the hole in the nest ring, and the flexible sleeve is connected at one end to a pocket bottom having a pocket opening and a pocket flap releasably fastened to the pocket opening by a fastener, the pocket bottom configured to receive a removable insert selected from the group consisting of an absorbent insert, a padded insert, and a permeable insert.

* * * * *